United States Patent
Oehler et al.

(10) Patent No.: US 9,485,907 B2
(45) Date of Patent: Nov. 8, 2016

(54) MODULAR AGRICULTURAL FLAIL CUTTING UNIT FOR A WORKING MACHINE

(75) Inventors: Wolfgang Oehler, Wipperfürth (DE); Alexander Nürnberg, Herdecke (DE)

(73) Assignee: CNH Industrial America LLC, New Holland, PA (US)

( * ) Notice: Subject to any disclaimer, the term of this patent is extended or adjusted under 35 U.S.C. 154(b) by 21 days.

(21) Appl. No.: 14/233,623

(22) PCT Filed: Jul. 20, 2012

(86) PCT No.: PCT/EP2012/064353
§ 371 (c)(1),
(2), (4) Date: Jan. 17, 2014

(87) PCT Pub. No.: WO2013/011139
PCT Pub. Date: Jan. 24, 2013

(65) Prior Publication Data
US 2014/0165527 A1 Jun. 19, 2014

(30) Foreign Application Priority Data
Jul. 20, 2011 (DE) ........................ 10 2011 051 981

(51) Int. Cl.
| | |
|---|---|
| *A01D 34/00* | (2006.01) |
| *A01D 34/43* | (2006.01) |
| *A01D 34/535* | (2006.01) |
| *A01D 34/835* | (2006.01) |
| *A01D 34/42* | (2006.01) |
| *A01D 34/44* | (2006.01) |
| *A01D 34/62* | (2006.01) |

(52) U.S. Cl.
CPC ............. *A01D 34/435* (2013.01); *A01D 34/42* (2013.01); *A01D 34/44* (2013.01); *A01D 34/535* (2013.01); *A01D 34/62* (2013.01); *A01D 34/8355* (2013.01)

(58) Field of Classification Search
CPC .. A01D 34/435; A01D 34/665; A01D 34/42; A01D 34/44
USPC ............. 56/13.6, 7, 156, 198, 220, 249, 294
See application file for complete search history.

(56) References Cited

U.S. PATENT DOCUMENTS

| | | | | |
|---|---|---|---|---|
| 2,204,914 | A * | 6/1940 | Schmidt | .............................. 56/7 |
| 2,465,405 | A | 3/1949 | Dill | |
| 2,625,784 | A * | 1/1953 | Kelsey | .............................. 56/192 |
| 2,711,615 | A * | 6/1955 | Boice, Jr. | .............................. 239/729 |
| 2,974,472 | A * | 3/1961 | Gebhart | ............... A01B 39/085 |
| | | | | 56/15.9 |
| 3,038,286 | A * | 6/1962 | Hall | .............. A01D 75/20 |
| | | | | 56/7 |
| 3,410,063 | A * | 11/1968 | Speiser | .............................. 56/7 |

(Continued)

FOREIGN PATENT DOCUMENTS

| | | |
|---|---|---|
| DE | 7905774 | 3/1979 |
| DE | 19618308 | 11/1997 |

(Continued)

*Primary Examiner* — Árpád Fábián-Kovács
(74) *Attorney, Agent, or Firm* — Patrick M. Sheldrake

(57) ABSTRACT

A modular agricultural cutting unit for a harvester has a plurality of cutting modules each having a horizontally arranged shaft drivable in rotation and a plurality of cutting elements arranged on the appropriate shaft for cutting crop material, wherein the shafts of the cutting modules are arranged to not overlap in the cutting width of the cutting unit.

9 Claims, 9 Drawing Sheets

(56) References Cited

U.S. PATENT DOCUMENTS

| | | | |
|---|---|---|---|
| 3,529,412 A | 9/1970 | Meiners | |
| 3,594,994 A * | 7/1971 | Engler | 56/307 |
| 3,646,733 A * | 3/1972 | Clapsaddle, Jr. | 56/7 |
| 3,650,096 A * | 3/1972 | Caldwell | A01B 73/044 |
| | | | 56/7 |
| 3,651,702 A | 3/1972 | Speiser | |
| 3,678,671 A * | 7/1972 | Scarnato et al. | 56/505 |
| 3,977,165 A * | 8/1976 | Klinner et al. | 56/16.4 R |
| 4,148,174 A * | 4/1979 | Mathews | A01D 75/30 |
| | | | 56/12.7 |
| 4,161,858 A * | 7/1979 | Gerrits | A01D 75/30 |
| | | | 56/7 |
| 4,227,365 A * | 10/1980 | van der Lely et al. | 56/13.6 |
| 4,287,706 A * | 9/1981 | Tobin, Jr. | A01D 75/30 |
| | | | 56/7 |
| 4,330,981 A * | 5/1982 | Hall | A01D 75/30 |
| | | | 56/7 |
| 4,370,846 A * | 2/1983 | Arnold | A01D 75/30 |
| | | | 56/16.2 |
| 4,481,755 A * | 11/1984 | Carr | A01D 75/30 |
| | | | 56/16.2 |
| 4,815,259 A * | 3/1989 | Scott | A01D 75/306 |
| | | | 280/411.1 |
| 4,840,019 A * | 6/1989 | Pingry | 56/13.6 |
| 5,012,635 A * | 5/1991 | Walters et al. | 56/13.6 |
| 5,105,609 A * | 4/1992 | Covington et al. | 56/13.5 |
| 5,297,378 A * | 3/1994 | Smith | A01D 67/00 |
| | | | 56/11.9 |
| 5,343,680 A * | 9/1994 | Reichen et al. | 56/249 |
| 5,359,835 A * | 11/1994 | Majkrzak | 56/8 |
| 5,477,666 A * | 12/1995 | Cotton | A01D 34/62 |
| | | | 56/251 |
| 5,497,603 A * | 3/1996 | Short | 56/7 |
| 5,953,895 A * | 9/1999 | Hobbs | A01D 34/8355 |
| | | | 171/58 |
| 5,964,079 A * | 10/1999 | Mellin et al. | 56/13.6 |
| 6,131,378 A * | 10/2000 | Lees | A01D 75/303 |
| | | | 56/13.6 |
| 6,481,191 B1 * | 11/2002 | Short | 56/7 |
| 6,688,094 B2 * | 2/2004 | Berndt et al. | 56/249 |
| 7,661,253 B2 * | 2/2010 | Pruitt et al. | 56/13.6 |
| 7,730,703 B1 * | 6/2010 | Ehrhart et al. | 56/13.6 |
| 8,028,505 B1 * | 10/2011 | Roberge | 56/13.5 |
| 8,056,307 B2 * | 11/2011 | Roberge | A01D 34/665 |
| | | | 56/6 |
| 8,769,916 B2 * | 7/2014 | Van Loon | A01D 67/005 |
| | | | 56/6 |
| 2006/0053761 A1 * | 3/2006 | Lougheed et al. | 56/15.8 |
| 2009/0126329 A1 * | 5/2009 | Mills | 56/249 |
| 2010/0186361 A1 * | 7/2010 | Bryant et al. | 56/10.7 |
| 2011/0078988 A1 * | 4/2011 | Roberge | 56/13.6 |

FOREIGN PATENT DOCUMENTS

| | | | | |
|---|---|---|---|---|
| DE | 20318859 | | 4/2004 | |
| FR | 2937829 | | 5/2010 | |
| NL | 294040 | | 4/1965 | |
| WO | WO 2005096800 | * | 10/2005 | A01D 34/8355 |

* cited by examiner

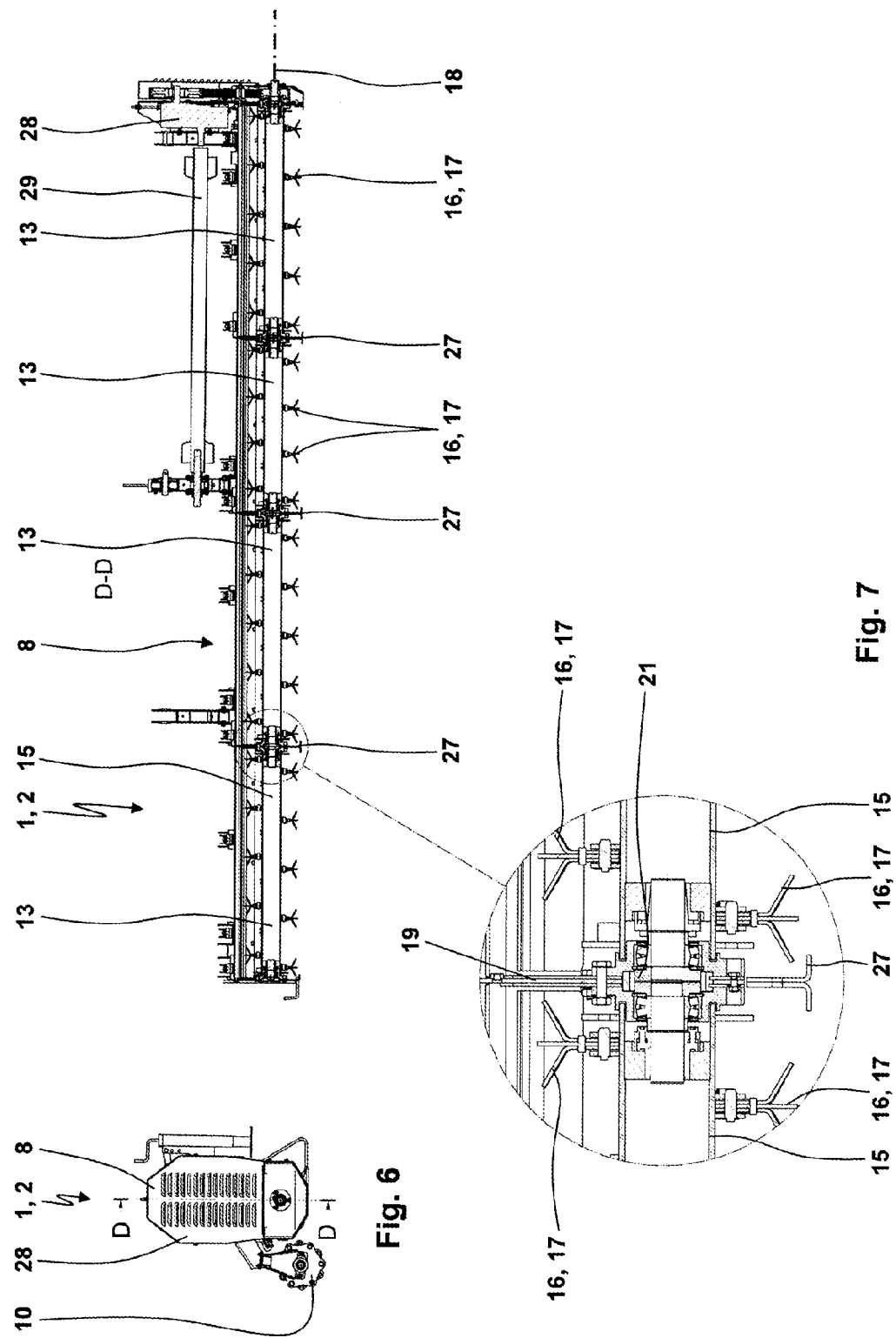

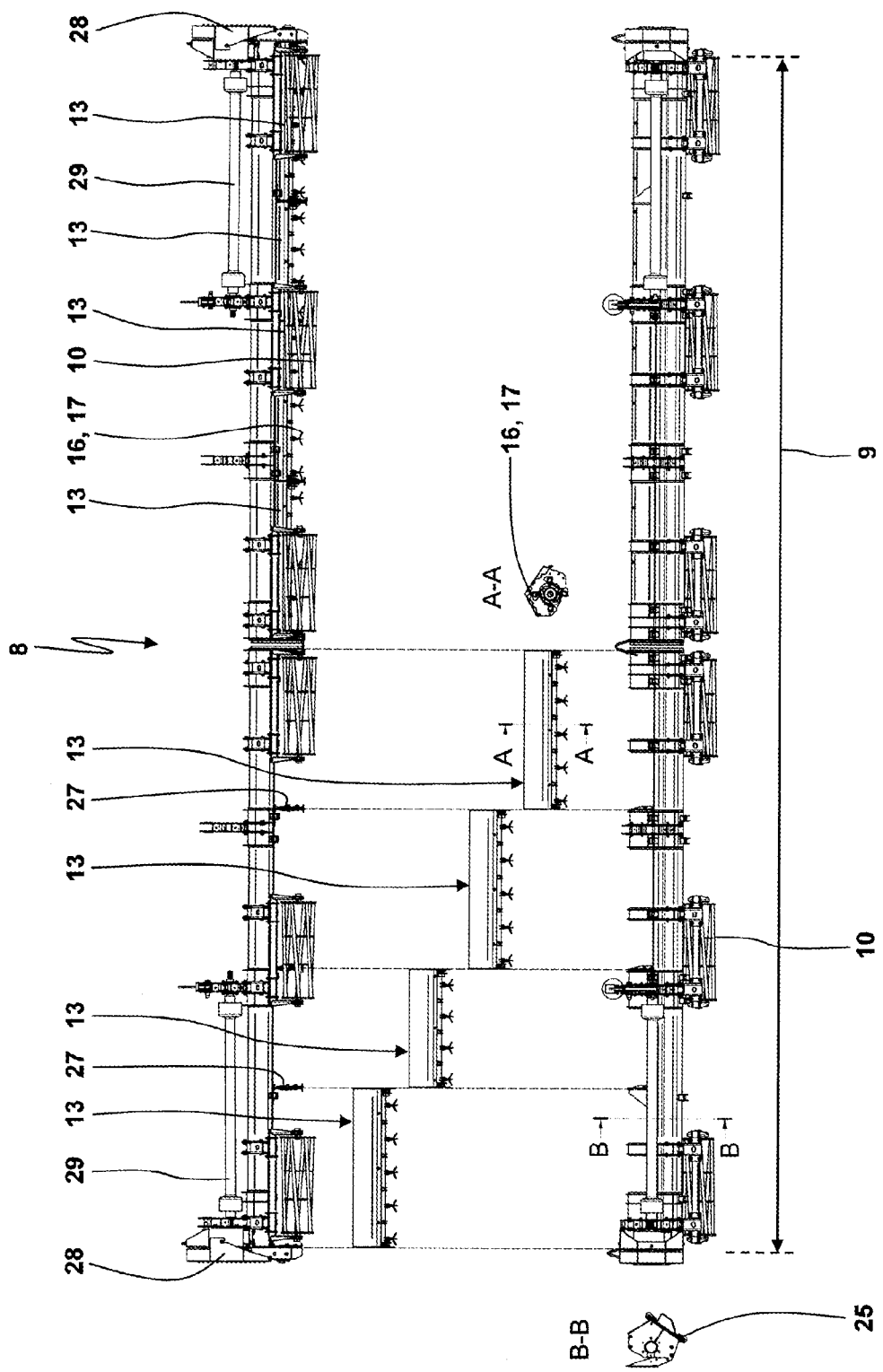

MODULAR AGRICULTURAL FLAIL CUTTING UNIT FOR A WORKING MACHINE

This application is the US National Stage filing of International Application Serial No. PCT/EP2012/064353 filed on Jul. 20, 2012 which claims priority to German Application DE 10.2011.051.981.5 filed Jul. 20, 2011, each of which is incorporated herein by reference in its entirety.

FIELD OF THE INVENTION

The present invention relates to an agricultural cutting unit having a horizontally disposed shaft driven in rotation, with a plurality of cutting elements arranged on it.

The cutting unit is mounted on a working machine or forms it, and is used in particular for cutting and/or shredding grass, straw, grain, wheat, corn, rapeseed, sunflowers, beans, other stalks and other plants and plant parts. The cutting unit is aligned with its cutting plane approximately horizontal.

The cutting unit may be in particular a flail cutter for a combine harvester.

STATE OF THE ART

An agricultural cutting unit for a mobile working machine is known from the brochure "Spearhead.eu; Spearhead—Stoppelmanagement: Die Erntereste im Griff" (Stubble Management: The harvest residue under control). The mobile working machine is a tractor onto which the cutting unit is mounted. The cutting unit is designed as a flail cutting unit with one horizontally disposed shaft driven in rotation, and a plurality of flails arranged on the shaft for cutting crop material, particularly harvest residues. There may also be a plurality of cutting units mounted on the working machine, with their shafts and the individual cutting widths of the cutting units overlapping so as to obtain one overall cutting width. For this, some of the cutting units are arranged e.g. in front of the front wheels of the tractor and others behind the rear wheels of the tractor.

In addition, it is generally know in the state of the art to provide a combine harvester with several cutting units to chop the harvest residue adjacent the header (for harvesting), which defines the working width of the combine harvester. Herein, one of the cutting units is arranged more or less directly in the direction of travel behind the main header, while two other cutting units are attached behind the rear wheels at the end of the combine harvester and in this way, the shafts of the cutting units and the cutting widths of the cutting units overlap to form the overall cutting width.

OBJECT OF THE INVENTION

The invention has as its object to provide an agricultural cutting unit for a working machine, with which different cutting widths of the cutting unit can be created in a simple and variable manner.

SOLUTION

The object of the invention is achieved by the features of the independent patent claim. Other preferred embodiments of the invention are referred to in the dependent patent claims.

SUMMARY OF THE INVENTION

The invention relates to a modular agricultural cutting unit for a working machine. The cutting unit has a plurality of cutting modules, each having a horizontally arranged shaft drivable in rotation, and a plurality of cutting elements arranged on the appropriate shaft for cutting crop material, wherein the shafts of the cutting modules are not arranged to overlap in the cutting width of the cutting unit.

The invention further relates to a working machine, in particular a combine harvester or other drivable mowing device, comprising the modular cutting unit as described above.

The invention also relates to a modular flail cutting unit for a combine harvester with a supporting frame and a plurality of flail modules each having a horizontally arranged shaft driven in rotation, and a plurality of flails mounted on the appropriate shaft, for cutting crop material. The flail modules are designed as separate and individually manageable units and for forming different cutting widths of the flail cutting unit by combining different numbers of flail modules of the same and/or different widths, directly or indirectly on the support frame and connected together by couplings. The flail modules extend over the entire working width of the combine harvester.

DEFINITIONS

In this application, an agricultural cutting unit is considered to be a cutting unit for the cutting, mowing, slicing, chopping, mulching, etc. of crop material in the sector of agriculture and forestry, in the municipal sector for the maintenance of public green spaces and for the care of other planted areas.

In this application, a working machine is understood to be a self-propelled working machine, a towed working machine, a mower, a mowing machine, a combine harvester or a tractor having, in each case, an agricultural cutting unit as defined above.

The working machine has a working width. The working width is understood to be the effective area of action of the working machine perpendicular to its direction of travel. If the working machine is a mower, the working width also corresponds to the cutting width of the cutter unit. If the working machine on the other hand is a combine harvester, the working width of the combine harvester corresponds to the actual cutting width of the header (main cutting unit), while the cutting width of the secondary cutting unit for cutting harvest residues is referred to not as the working width, but rather as the cutting width. A modular cutting unit is considered in this application to be a cutting unit which has several separate modules, the modular cutting unit being created by their direct assembly with one another. In other words, a modular cutting unit is not considered to be the separate cutting units of a working machine, which are mounted at different points on the working machine (mostly in an overlapping arrangement), to produce an overall cutting width.

The cutting area of the cutting unit is the area wherein the cutting unit cuts the crop material. The cutting width of the modular cutting unit is considered to be the width of its cutting area perpendicular to the direction of travel of the working machine.

FURTHER DESCRIPTION OF THE INVENTION

The new agricultural cutting unit comprises a plurality of cutting modules which are assembled together to form the cutting unit, and so define the cutting width of the cutting unit, without there being any overlap in the cutting width of the cutting unit. By the use of modules, each with a separate shaft, it is possible to produce different cutting widths of the cutting unit to create a modular system. The cutting modules can therefore be standard units, independent of the overall cutting width of the cutting unit, which can therefore be produced in larger quantities and at lower cost. From cutting modules with an average width of e.g. 90 cm and/or 120 cm (3 feet or 4 feet) very large variable cutting widths of the cutting unit can be created, including very large widths e.g. 3 m.

Another advantage over the prior art is that the assembly space required for the arrangement of the cutting unit perpendicular to the width of the cutting unit is reduced. This is because the comparatively short shafts of the modules may have a lower flexural rigidity and therefore a smaller diameter than would be the case with a continuous shaft. Since the diameter of the shaft, due to the arrangement of the cutting elements on it, largely defines the installation space of the cutting unit perpendicular to its width, this results in options for mounting the cutting unit that did not exist in the state of the art.

In this way it is for the first time possible to arrange the cutting modules with their cutting elements in such a way that the cutting area of the entire cutting unit is, with respect to the direction of travel of the machine, in front of the front wheels. Particularly when the cutting modules of the cutting unit extend over the entire working width of the working machine, this has the advantage that the crop material is not driven over and pressed down by the wheels of the working machine, before it is cut. This generates consistently good cutting results over the entire cutting width of the working machine. In addition, it is ensured that the cutting results do not depend on the driving position of the working machine, i.e. it is immaterial whether the working machine is travelling in a straight line or in a curve.

The cutting modules are therefore preferably arranged so that their shafts can be driven around a common rotation axis. The rotation axis is considered to be the geometrical axis. The shafts of the cutting modules may each have their own drive or completely or partially separate drives.

The cutting modules are preferably formed as separate and individually managed units for the construction of different cutting widths of the cutting unit by combining different numbers of cutting modules of the same and/or different widths. Even when using only one cutting module width, a wide range of different overall widths is created by the arrangement as desired of n cutting modules. By the use of cutting modules of different widths—e.g. of cutting modules with 2, 3, 4, or more different widths, there is still a much higher variability, so that the cutting unit can be adapted to virtually any working width of the working machine.

The cutting modules can be arranged directly or indirectly on a supporting frame. The supporting frame has a greater length than the cutting modules and accomodates several cutting modules. The supporting frame may be one piece or consist of two or more interconnected sections. Advantageously, the supporting frame therefore is exclusively determined for the defined cutting unit cutting width to be created. To achieve the desired compactness of the cutting unit, it is therefore preferable that the cutting modules are of relatively small dimensions and have a shaft with a relatively small diameter and that the supporting frame actually bears the forces and moments and provides the necessary flexural rigidity.

The cutting modules can be directly or indirectly attached to the support frame without drilling by clamping. The arrangement without drilling means that the modules can be easily and rapidly mounted to the support frame, which gives significant advantages both during initial installation and later maintenance and servicing of the cutting unit.

A plurality of connection plates may be secured by clamping and without drilling to the support frame and the cutting modules may be secured to the connection plates. This further simplifies assembly and disassembly of the modular cutting unit.

Two adjacent cutting modules can be connected by means of a coupling, in which the coupling has a spring element which is designed to absorb forces from relative movements of the shafts of the interconnected cutting modules. This ensures, on the one hand, that the torque required for driving the rotating shafts is efficiently transmitted by a shaft through the coupling to the next shaft, and on the other hand, that no unwanted forces from relative movements of the shafts are transmitted.

The cutting unit is preferably a flail cutter, in which the cutting modules then are designed as flail modules and the cutting elements as flails. In particular harvest residues can be effectively cut, shredded and mulched using a flail cutter.

The working machine may be in particular a combine harvester. The new agricultural cutting unit then is preferably used as a secondary cutting unit. The combine harvester, as is known, has a main cutting unit, with which the crop, e.g. wheat, is cut. The modular cutting unit is then mounted in particular on the back of the so-called "header" of the combine. The combine can be conceived especially so that its main cutting unit is situated higher than in the state of the art—i.e. at a greater horizontal distance from the ground. This reduces the amount of stems drawn into the combine harvester. The new modular cutting unit is then used to cut the remaining relatively long stubble from the ground and to chop it. The modular design and the reduced space requirements mean that the cutting unit now can be arranged, in the direction of travel, behind the main cutting unit and yet in front of the front wheels of the combine.

Advantageous further developments of the invention are disclosed in the claims, the description and the drawings. The advantages of features and combinations of various features mentioned in the introduction to the description are by way of example only, and may come into effect alternatively or cumulatively, without the benefits having to be obtained by embodiments of the invention. Other features are shown in the drawings—in particular the geometries represented and the relative dimensions of several components to one another and their relative arrangement and functional connection. The combination of features of different embodiments of the invention or of features of different claims is also possible by way of a departure from the chosen references of the patent claims and is hereby suggested. This also applies to those features which are illustrated in separate drawings or are referred to in their description. These features may also be combined with features of different patent claims. Likewise, features listed in the patent claims may be omitted for further embodiments of the invention.

The features referred to in the claims and the specification are to be understood, in terms of their number, as exactly that number or a larger number than said number being present, without the need for the explicit use of the words "at least". For example, when a shaft is mentioned, this should be understood either as precisely one shaft, or two shafts or several shafts being present. If, however, an exact number of a feature is being referred to, the adjective "just" is inserted before the appropriate feature.

BRIEF DESCRIPTION OF THE DRAWINGS

The invention is further explained and described below using preferred embodiments as shown in the Figures.

FIG. 6 shows a side view of a part of a new working machine with a modular agricultural cutting unit.

FIG. 7 shows a sectional view of the cutting unit along the line D-D in FIG. 6 as well as a detailed view of the cutting unit.

FIG. 10 shows different views of an exemplary embodiment of the new cutting unit.

DETAILED DESCRIPTION

Figure 1:
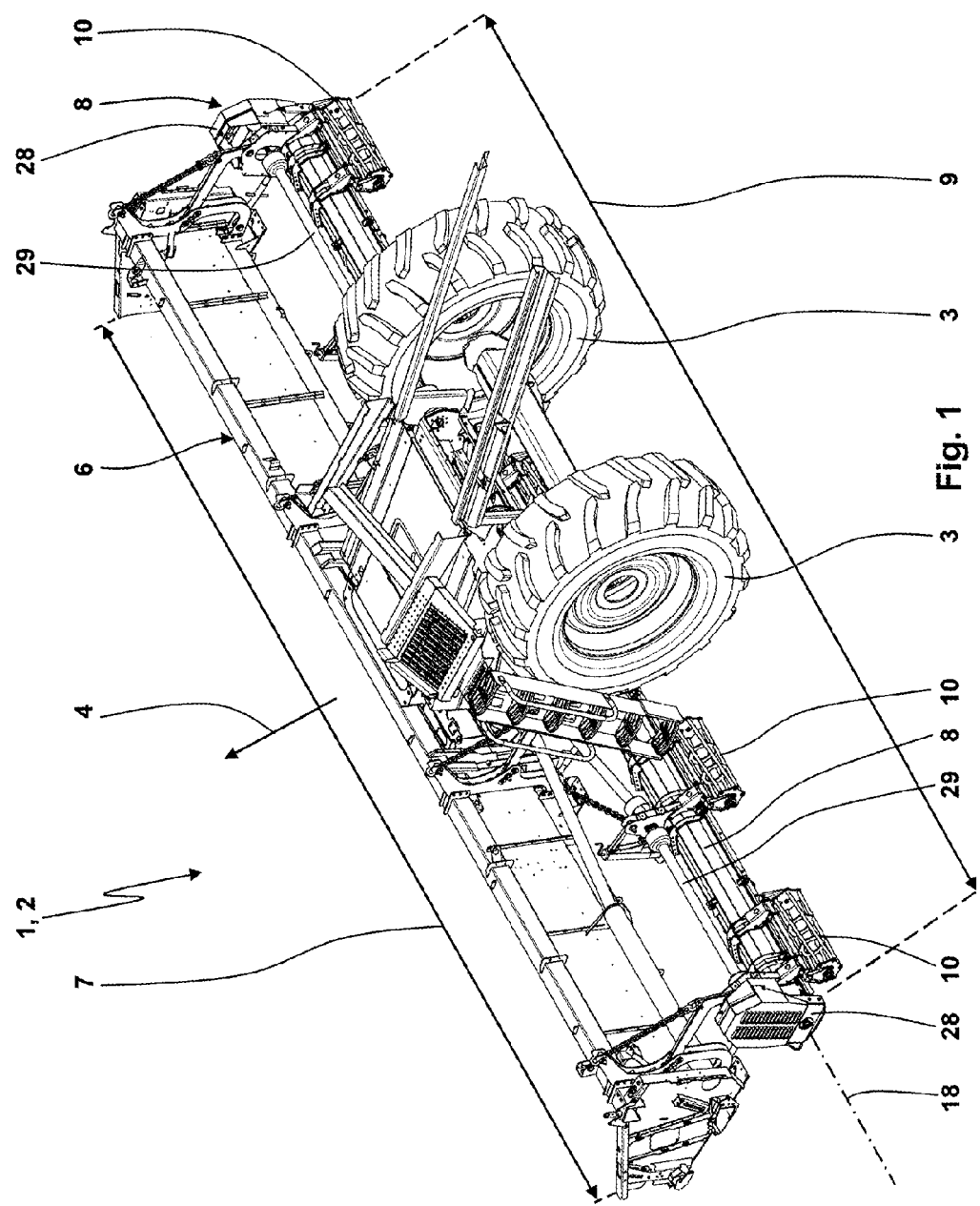
FIG. 1 shows a perspective view of the front portion of a first exemplary embodiment of the working machine with a modular agricultural cutting unit.
Figure 2:
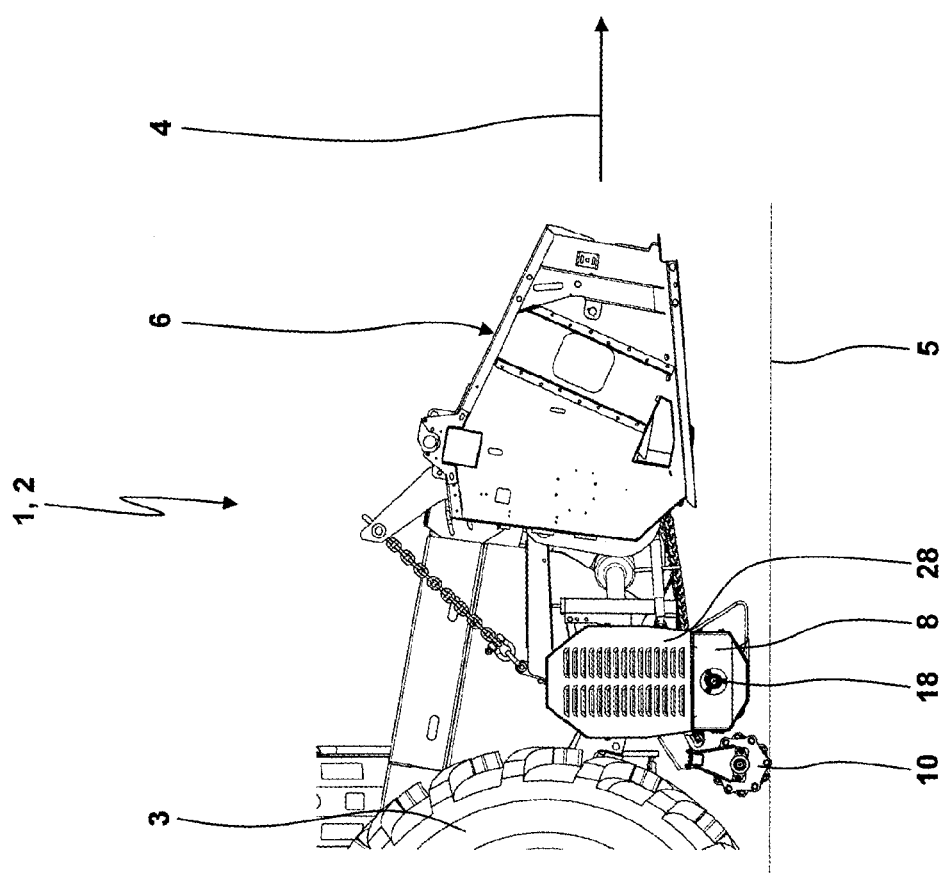
FIG. 2 shows a side view of the working machine according to FIG. 1.

FIGS. 1 and 2 show the front part of a working machine 1. In this case, working machine 1 is depicted as a combine harvester 2. However it could equally be a different working machine 1. Only the front part of working machine 1 is shown, as the rest of working machine 1 has no significance for the present invention.

Working machine 1 is mobile and therefore has several wheels, of which only the front wheels 3 are shown in FIGS. 1 and 2. To perform its work, working machine 1 moves in the direction of travel 4 along the ground 5.

The combine harvester 2 has a main cutting unit 6, which serves the actual harvesting process. The main cutting unit 6 defines the working width 7 of working machine 1 perpendicular to the direction of travel 4. The main cutting unit 6 is not the object of the present application and is therefore not described in detail below.

In addition to the main cutting unit 6, working machine 1 has a modular cutting unit 8. The modular cutting unit 8 is used for cutting the crop stubble left behind on the ground 5 by cutting unit 6, and has a cutting width 9, which approximately corresponds, in the combine harvester 2 shown here, to its working width 7. In other words, in the process used in combine harvester 2, in the direction of travel 4, the crop material is first cut by the main cutting unit 6 at a greater distance from the ground 5. Then all remaining stubble is cut off by the modular cutting unit 8 nearer to the ground 5, and cut up.

The cutting unit 8 is supported by rollers 10 on the ground 5, in particular it is guided by these during the travel of working machine 1. The rollers 10 have a cage design and in particular consist of metal. The rollers 10 provide good guidance for modular cutter 8 even in difficult ground conditions—e.g. rocks, holes, ramps, etc.

The cutting unit 8 extends over the entire working width 7 of working machine 1. Therefore no additional cutting units are required in order to cover the entire working width 7 of working machine 1 by several overlapping cutting widths of several cutting units, as is known from the state of the art. Hence, the cutting unit 8 only has one geometrical rotation axis 18.

Figure 3:
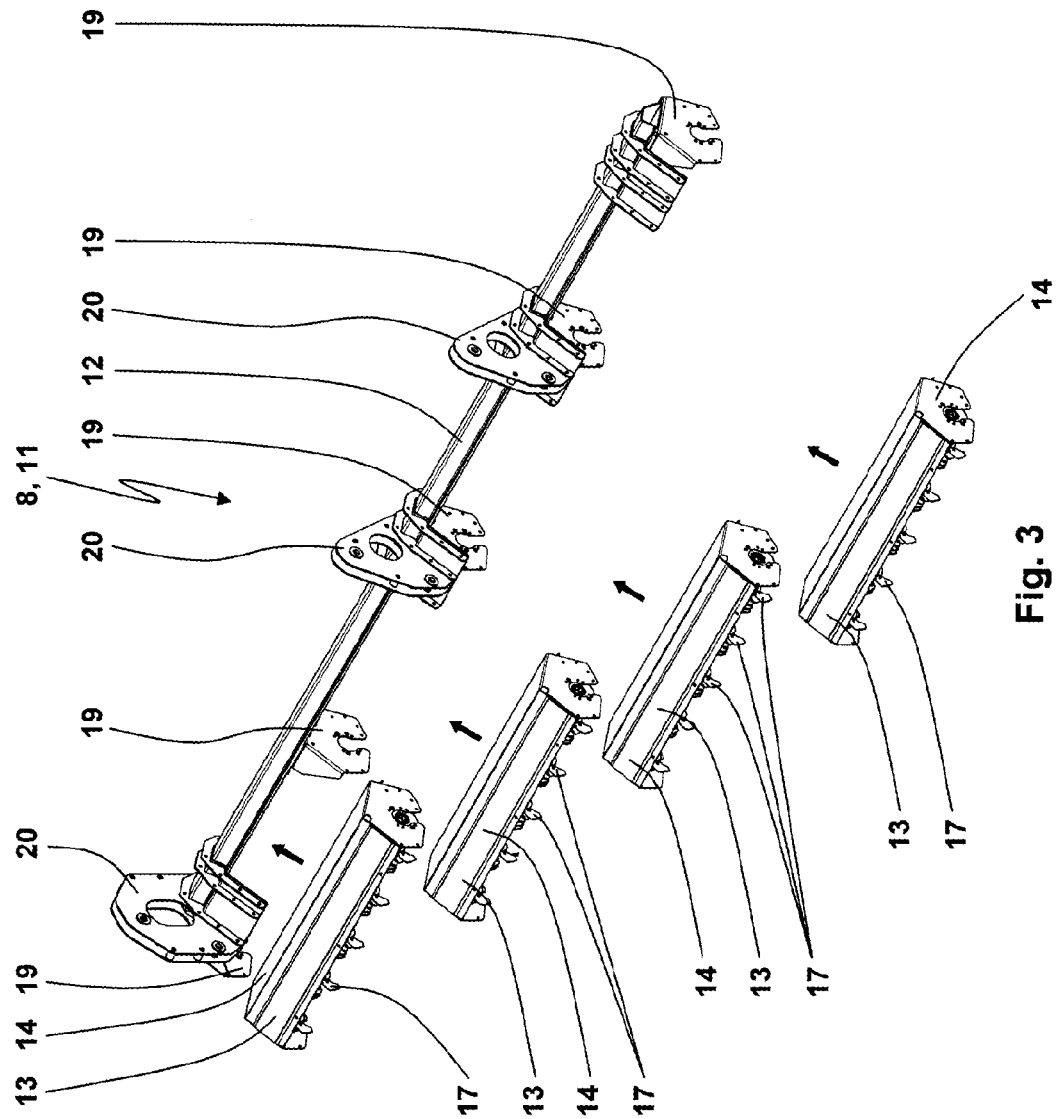
FIG. 3 shows a perspective view of an exemplary embodiment of the new modular agricultural cutting unit in a partially disassembled position.
Figure 4:
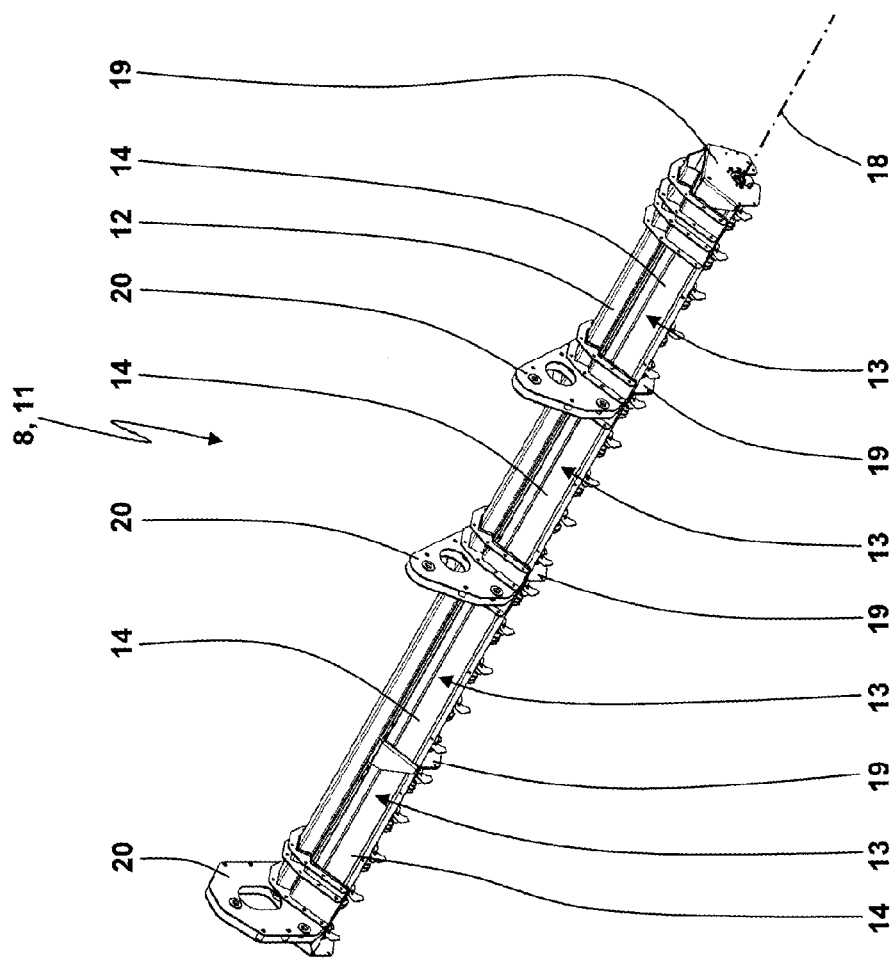
FIG. 4 shows the cutting unit of in FIG. 3 in its further mounted position.
Figure 5:
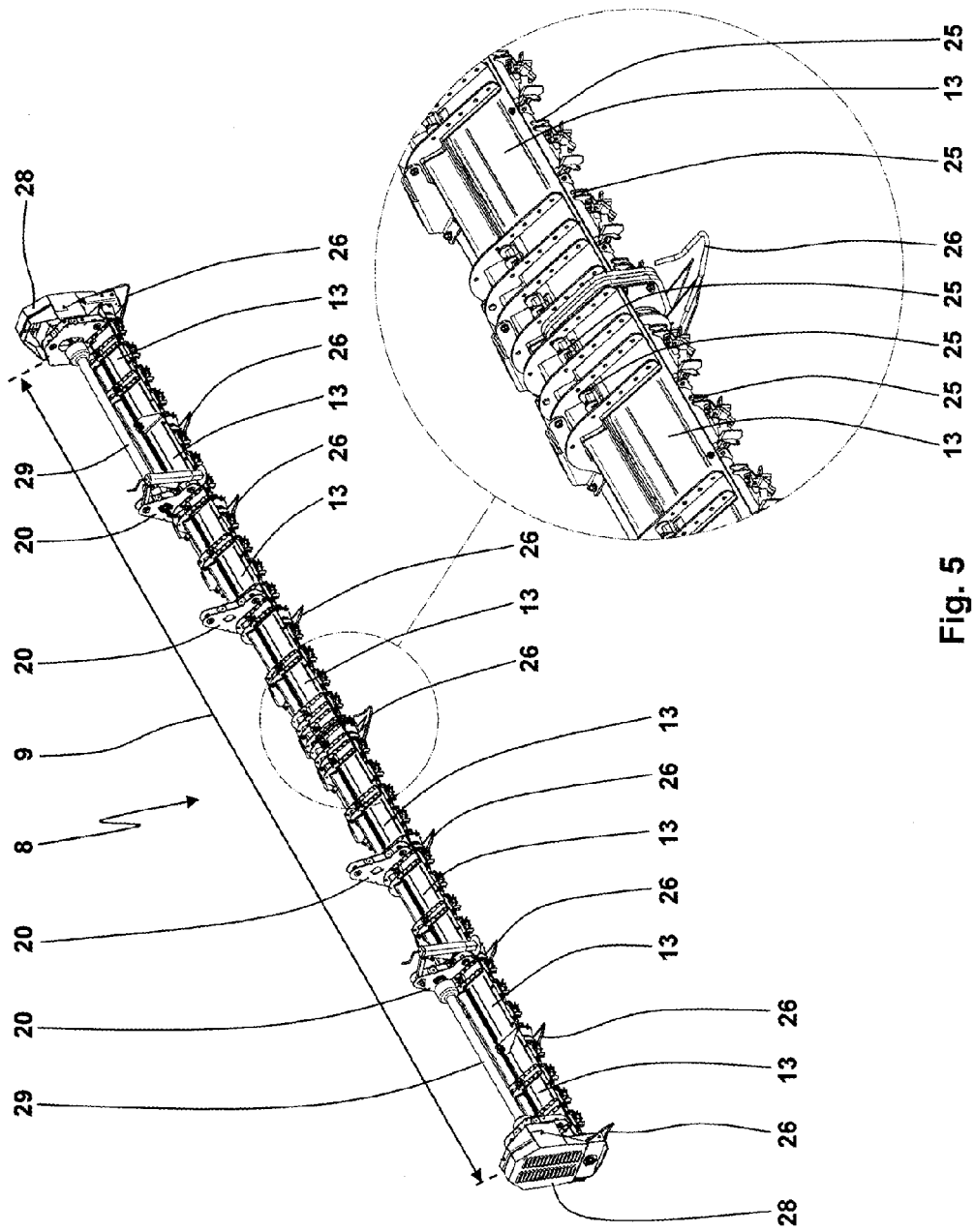
FIG. 5 shows a perspective view of an exemplary embodiment of the new modular agricultural cutter unit and a detailed view from the middle region of the cutting unit.

The new modular design of cutting unit 8 is clearly illustrated by FIGS. 3 and 4. The modular cutting unit 8 here takes the form of a flail cutter 11. It could, however, have taken the form of another type of cutting unit 8, for example with blades driven in counter-rotation. Cutting unit 8 has a supporting frame, one half of which is shown here. The full supporting frame 12 is shown in FIG. 5. Preferably, the section of the support frame 12 represented in FIGS. 3 and 4 consists of a one-piece profile. However, it could also consist of several pieces.

The cutting unit 8 comprises a plurality of cutting modules 13. Each of the cutting modules 13 has a housing 14 and a shaft 15 (see FIG. 7), which is arranged horizontally in the housing 14 and can be driven in rotation. In the illustrations of FIGS. 3 and 4, the shafts 15 are covered by the housing 14 and are therefore not visible. Each of the shafts 15 is provided with a plurality of cutting elements 16 for cutting crop material. In the illustrated exemplary flail cutting unit 11, the cutting elements 16 are flails 17.

The cutting modules 13 are designed as separate and individually manageable units for the construction of different cutting widths 9 of the cutting unit 8 by combining different numbers of cutting modules 13 of the same and/or different widths. In the example shown, there are arranged, on the represented section of support frame 12, four cutting modules 13 of the same width. The cutting modules 13 could however also have different widths (see, for example. FIGS. 4, 5, 10). The cutting modules 13 are arranged so that their shafts 15 can be driven by one or more drives 28 and drive shafts 29 (see FIG. 5) around the common rotation axis 18. Between two adjacent cutting modules 13 there is each time a crop divider 26, which serves to guide the crop material into the cutting area of the appropriate cutting module 13.

A plurality of connection plates 19 is attached without drilling, by means of clamps 25, to support frame 12 there. The cutting modules 13 are in turn bolted to each other and to the connecting plates 19. In addition connection brackets 20 are provided for connecting to the support system or linkage system of the working machine 1. Other components too—such as the rollers 10, drive components, etc. can be mounted variably to the support frame 12 by means of clamps 25.

FIGS. 6 and 7 show further structural details of the modular cutter unit 8. FIG. 7 shows in its upper region the left part of the cutting unit 8. In the enlarged section in particular it can be seen that the shaft 15 here takes the form of a hollow shaft and the shafts 15 of adjacent cutting modules 13 are connected to one another by a coupling 21.

Figure 9:
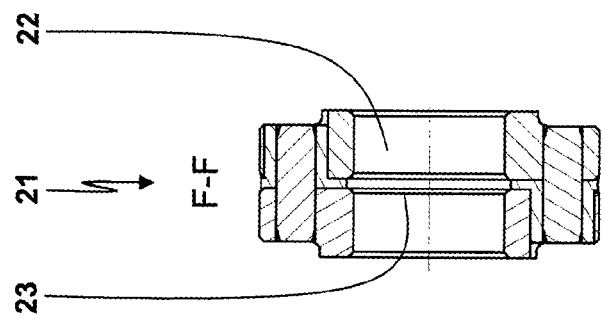
FIG. 9 shows a sectional view of the coupling along the line F-F in FIG. 8.
Figure 8:
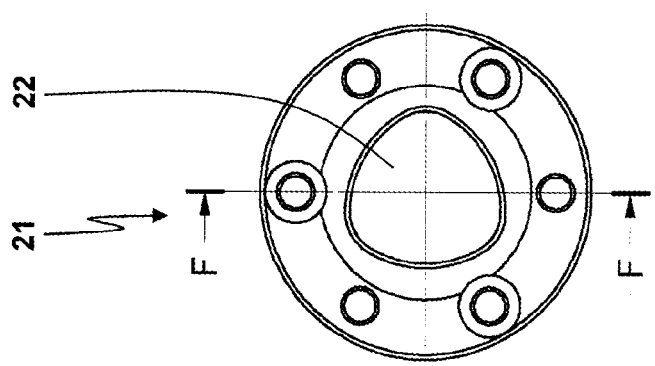
FIG. 8 shows a plan view of an exemplary embodiment of a new coupling for connecting two adjacent cutting modules.

Further details of the coupling 21 can be seen in FIGS. 8 and 9. The coupling 21 has a recess 22 for securing the adjacent shafts 15 and for torque transmission. In the present case, the opening 22 takes the form of a polygonal profile. Other designs would, however, also be possible. The coupling 21 has a resilient element 23 which is formed in particular from hard rubber. The two adjacent shafts 15 are connected in a very small space with each other by the coupling 21 comprising the element 23, which provides resilience in the direction of rotation. This means that a shaft offset of, e.g., up to approximately 0.3 mm and a shaft angle offset of up to approximately 1° can be compensated for between the shafts 15.

FIG. 10 is a full view of modular cutting unit 8, both with the left and right section of the support frame 12. The cutting unit 8 shown here thus extends over the entire cutting width 9. It is visible that the cutting modules 13 have different widths and in this way a cutting unit 8 with a very variable cutting width 9 can be assembled from standard modules in the manner of a modular insert system. The housings 14 of the cutting modules 13 may each have an undulating inner surface in order to generate turbulence during operation of cutting unit 8, thereby lengthening the residence time of the crop material in cutting unit 8 and achieving fine cutting of the crop material.

Figure 11:
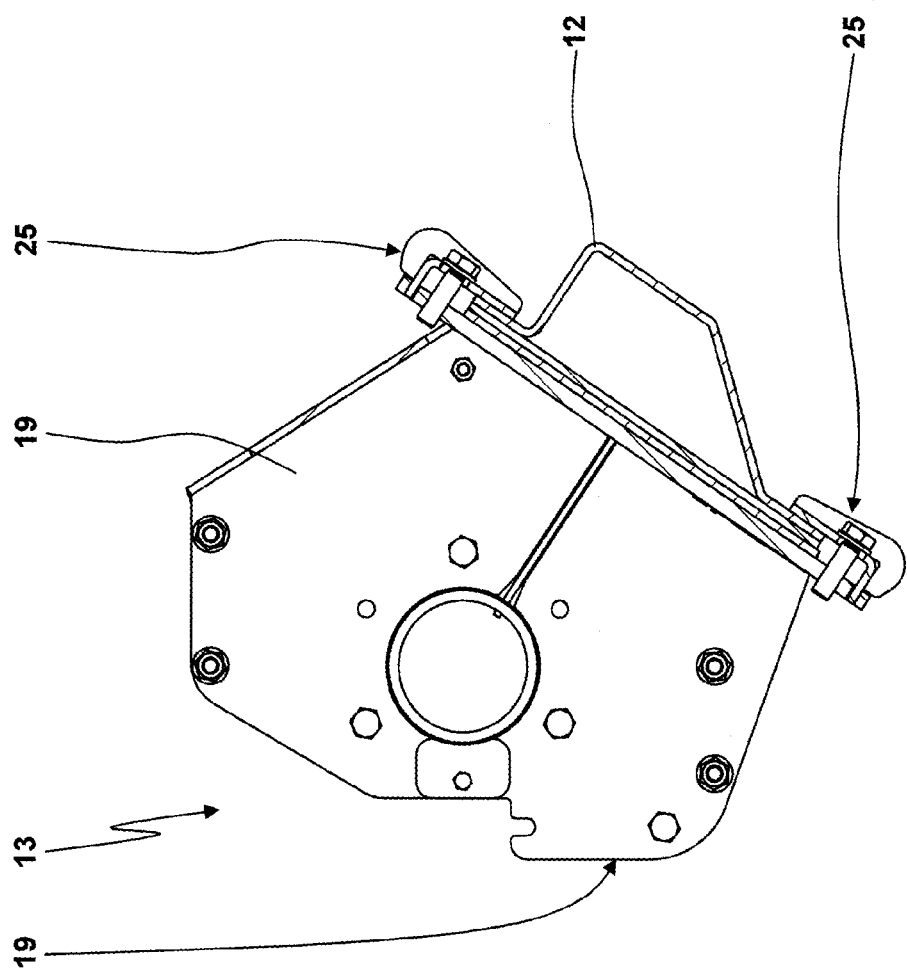
FIG. 11 shows a sectional view of an exemplary embodiment of a supporting frame with a cutting module mounted thereon using a clamp.

FIG. 11 shows a sectional view of the support frame 12 with a cutting module 13 mounted thereon. The connecting plate 19 is attached by clamping means 25 to support frame 12. The cutting module 13 is affixed to the connecting plate 19.

The invention claimed is:

1. A combine harvester, comprising:
   a main cutting unit having a working width when cutting a crop; and
   a secondary modular cutting unit mounted on the back of the main cutting unit, the secondary modular cutting unit including:
   an elongate supporting frame;
   a selectable plurality of cutting modules connected to the frame, each cutting module comprising a housing and having-a horizontally arranged shaft spanning between end sections of the housing, the shaft having a plurality of cutting elements arranged on the shaft for rotation about a rotational axis of the shaft for cutting crop material, wherein the respective shafts of adjacent cutting modules do not overlap in a cutting width directly behind the working width of the main cutting unit; and
   wherein a length of the supporting frame is longer than a length of the cutting modules and a plurality of connection plates extending from the supporting frame and the housings of the cutting modules are mounted to the connection plates.

2. A combine harvester according to claim 1, wherein the main cutting unit has a working width and the cutting modules extend over the entire working width of the combine harvester.

3. A combine harvester according to claim 1, wherein all the cutting modules are arranged so that their shafts can be driven around a common rotation axis.

4. A combine harvester according to claim 1, wherein the cutting modules have different widths in the direction of the cutting width.

5. A combine harvester according to claim 1, wherein the cutting modules are directly or indirectly arranged across the width of the elongate common supporting frame.

6. A combine harvester according to claim 5, wherein a crop divider is located between two adjacent modules.

7. A combine harvester according to claim 1, wherein the plurality of connection plates are secured to the supporting frame by clamps.

8. A combine harvester according to claim 1, wherein two adjacent cutting modules of the plurality of cutting modules are connected by a coupling and the coupling has a resilient element designed to absorb forces from relative movements of the shafts of the interconnected cutting modules.

9. A combine harvester according to claim 1, wherein the cutting modules are flail modules and the cutting elements are flails.

* * * * *